(12) United States Patent
Kachline

(10) Patent No.: US 9,713,853 B1
(45) Date of Patent: Jul. 25, 2017

(54) WIRE FEEDER

(71) Applicant: Lincoln Global, Inc., City of Industry, CA (US)

(72) Inventor: Jeffrey Kachline, Highland Heights, OH (US)

(73) Assignee: LINCOLN GLOBAL, INC., City of Industry, CA (US)

(*) Notice: Subject to any disclaimer, the term of this patent is extended or adjusted under 35 U.S.C. 154(b) by 0 days.

(21) Appl. No.: 15/056,683

(22) Filed: Feb. 29, 2016

(51) Int. Cl.
*B23K 9/28* (2006.01)
*B23K 9/12* (2006.01)
*B23K 9/133* (2006.01)

(52) U.S. Cl.
CPC .............. *B23K 9/122* (2013.01); *B23K 9/133* (2013.01)

(58) Field of Classification Search
CPC .................................. B23K 9/122; B23K 9/133
USPC .............. 219/136, 137.2, 137.71, 74, 76.17, 219/146.22, 146.1, 145.22, 124.5, 138, 219/121.72, 130.1
See application file for complete search history.

(56) References Cited

U.S. PATENT DOCUMENTS

| 2010/0320183 A1* | 12/2010 | Borchert | B23K 9/1006 219/130.1 |
| 2014/0048525 A1* | 2/2014 | Enyedy | B23K 9/1336 219/137.44 |

\* cited by examiner

*Primary Examiner* — Phuong Nguyen
(74) *Attorney, Agent, or Firm* — Perkins Coie, LLP.

(57) ABSTRACT

Embodiments of the present invention are wire feeders and wire feeder cable connections which include a power block portion, a cable connection portion and a liner guide assembly portion. The liner guide assembly portion and power block portion are structured and assembly so that a liner guide can be removed from a welding cable from inside the wire feeder, without removing the cable connector from the wire feeder.

8 Claims, 8 Drawing Sheets

WIRE FEEDER

TECHNICAL FIELD

Devices, systems, and methods consistent with embodiments of the present invention relate to wire feeders and more specifically, methods and systems to connect welding gun cables to wire feeders.

BACKGROUND

It is well known that in many welding operations a welding wire is used as a consumable electrode and is continuously delivered to the weld via a wire feeder. This is utilized in welding operations such as GMAW. An important aspect of using a consumable welding wire is maintaining a consistent and reliable flow of wire to the welding operation. As can be appreciated, interruptions in the flow of the welding wire may stop the welding process, thereby reducing its efficiency.

This consistent and reliable delivery of a welding wire is typically done using a wire feeder to which the welding gun is connected via a cable. The welding wire is pushed by the feeder through the cable and provided to the welding gun. To ensure proper delivery of the welding wire the welding cable has an internal wire guide (among other known components), which guides the wire to the torch. Because of friction between the wire and the guide, the wire guide wears over time and needs to be replaced.

In known wire feeder configurations, the replacement of the wire guide in the cable is a time consuming process that can result in damage to components of the wire feeder and/or the cable connection, at the point where the cable is connected to the wire feeder. This delay and damage can decrease the overall efficiency of a welding operation, due to increased delay and costs.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a wire feeder and wire feeder connection assembly which provides improved accessibility. The wire feeder contains a power block connection and a connection which includes a liner guide assembly having a removable nipple portion which allows a wire guide liner to be removed from inside the wire feeder without having to disconnect the weld gun cable from the wire feeder. Other aspects and embodiments of the present invention will be discussed in more detail below.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

Exemplary embodiments described herein are particularly applicable for use in connection with welding wire feeders and, therefore, embodiments of the present invention will be described with particular reference to wire feeders used in connection with a welding operation. However, the claimed invention has broader applications and may be used with other types of wire or other wire-like materials.

Figure 1:
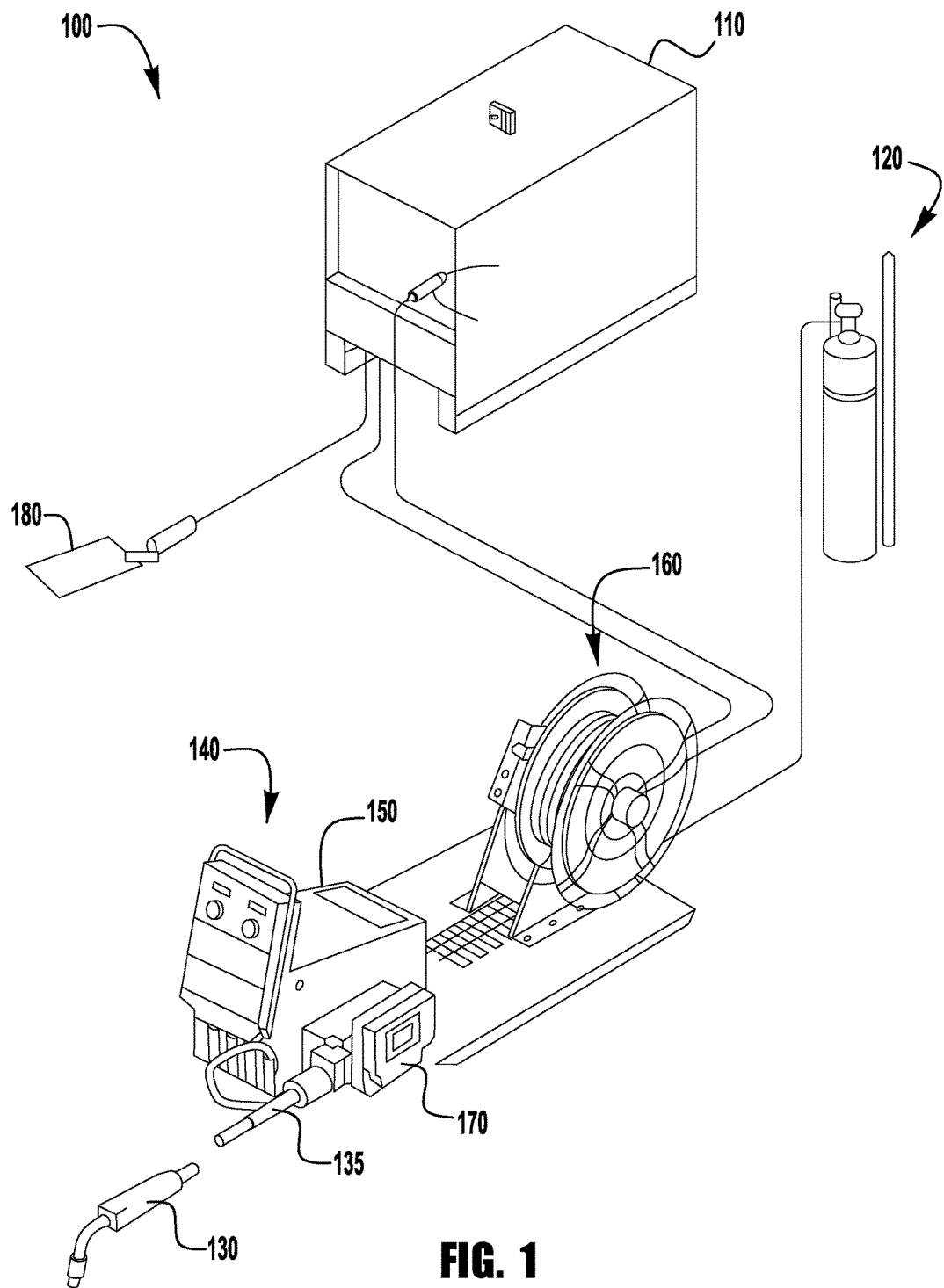
FIG. 1 is a diagrammatical representation of an exemplary welding system.

FIG. 1 illustrates an exemplary embodiment of an arc welding system 100 having a wire feeder 140. The system 100 includes a welding power source 110, the welding wire feeder 140, a welding wire source 160, a gas source 120, and a welding gun 130. The wire feeder 140 includes a controller 150 and a wire gripping device 170. The controller 150 may include a motor (not shown) that drives the wire gripping device 170 to pull a welding wire electrode from the welding wire source 160 through the wire gripping device 170 and into the welding gun 130 via a welding cable 135. Such welding systems are well known in the art. A first electrical terminal of the welding power source 110 may be connected to a work piece 180 such that the welding wire electrode, which is electrically connected to a second electrical terminal of the welding power source, may be applied to the work piece 180 via the welding gun 130 to produce a weld in an arc welding operation. Embodiments of the present invention are concerned with improvements to the connection of the cable 135 to the wire feeder 140, as will be explained further below.

Figure 2:
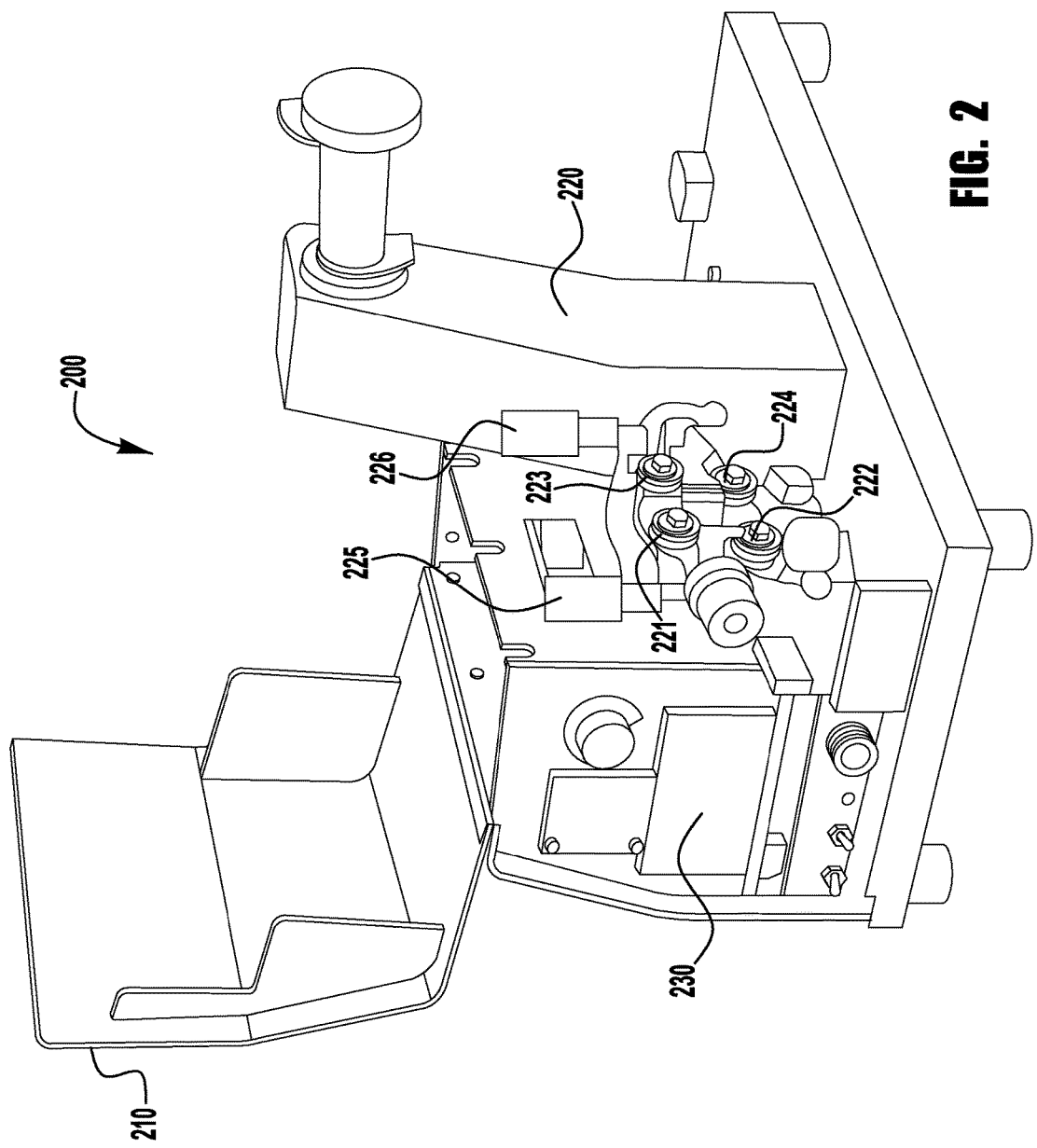
FIG. 2 is a diagrammatical representation of an exemplary wire feeder.

FIG. 2 illustrates an exemplary embodiment of a wire feeder 200 that may be used in the arc welding system 100 of FIG. 1. A cover 210 of the wire feeder 200 is opened to show a wire gripping device 220. As shown, the cover 210 has a moveable portion, such as a door or moveable cover section which allows easy access to the interior of the wire feeder and the wire feeding mechanisms. The door portion can be hinged to the rest of the cover or housing to allow for easy opening. The wire feeder 200 also includes a controller 230 which may be similar to the controller 150 of FIG. 1, for example. The wire gripping device 220 includes a first pair or rotatable rollers 221 and 222, and a second pair of rotatable rollers 223 and 224. Each pair is capable of gripping a welding wire there between and rotating to feed the welding wire from a welding wire source 160 to a welding gun 130. The wire gripping device 220 includes a force generating portion having two straight or linear adjustable force generating mechanisms (force generators) 225 and 226 (e.g., springs and adjustment elements) to adjust the gripping force between each pair of rollers, respectively. The construction of operation of exemplary wire feeders are well known and need not be described in detail herein. Exemplary wire feeders can include user input devices, controllers, CPUs and other components to facilitate the use of the wire feeder in multiple different types of welding operations. In fact, in some exemplary embodiments, the wire feeder 200 can be used in welding operations in which the torch is water cooled. Such systems need not be described in detail herein, as they are generally known.

Figure 3:
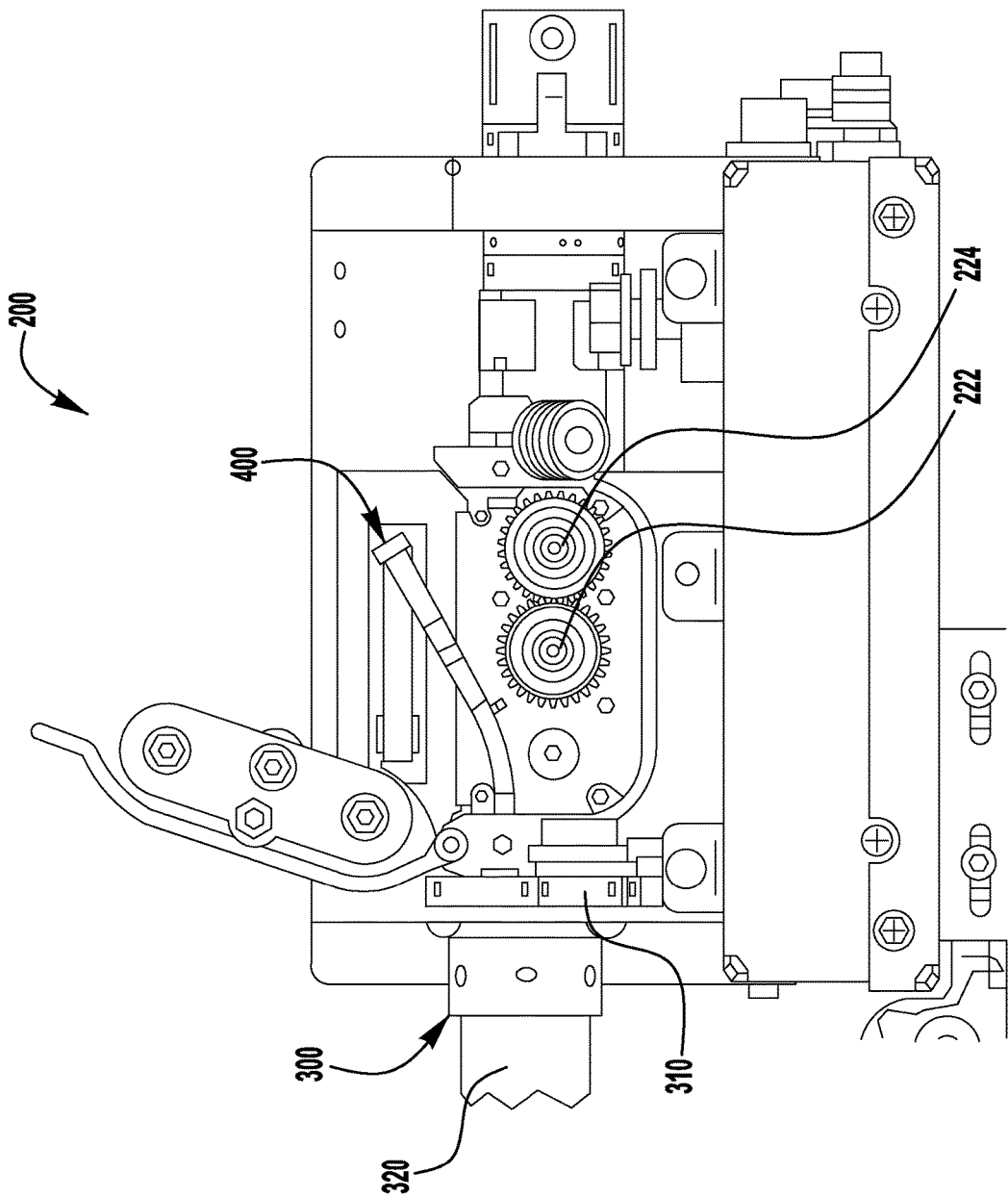
FIG. 3 is a diagrammatical representation of a side view of an exemplary wire feeder having an exemplary cable connection.

FIG. 3 is a side view of another exemplary embodiment of a wire feeder which has a welding cable connection 300 consistent with an exemplary embodiment of the present invention. The connection 300 includes a power block portion 310 which is coupled to a cable connector portion 320, where the power block portion is mounted to an inside surface of the wire feeder housing and the cable connector portion 320 is mounted to the power block portion 310 outside of the housing and the cable 135 is connected to the cable connector portion 320. Also, as shown, the cable connection 300 and the power block portion 310 are configured such that the wire guide 400 for the cable 135 can be removed from inside the wire feeder 200 as shown. In prior wire feeder systems the cable 135 would have to be removed from the connector 320 for the wire guide 400 to be removed from the cable 135. As stated previously, this process is time consuming and increases the risk of damaging components. A such, embodiments of the present invention represent an improvement over prior wire feeder systems.

Figure 4A:
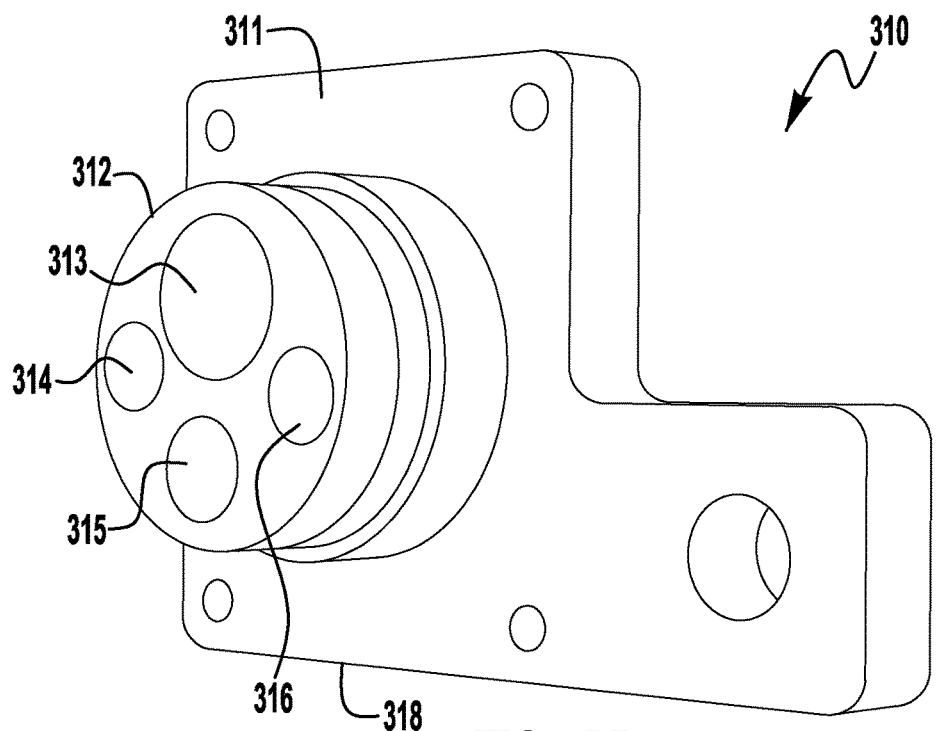
FIGS. 4A and 4B are diagrammatical representations of an exemplary power block.
Figure 4B:
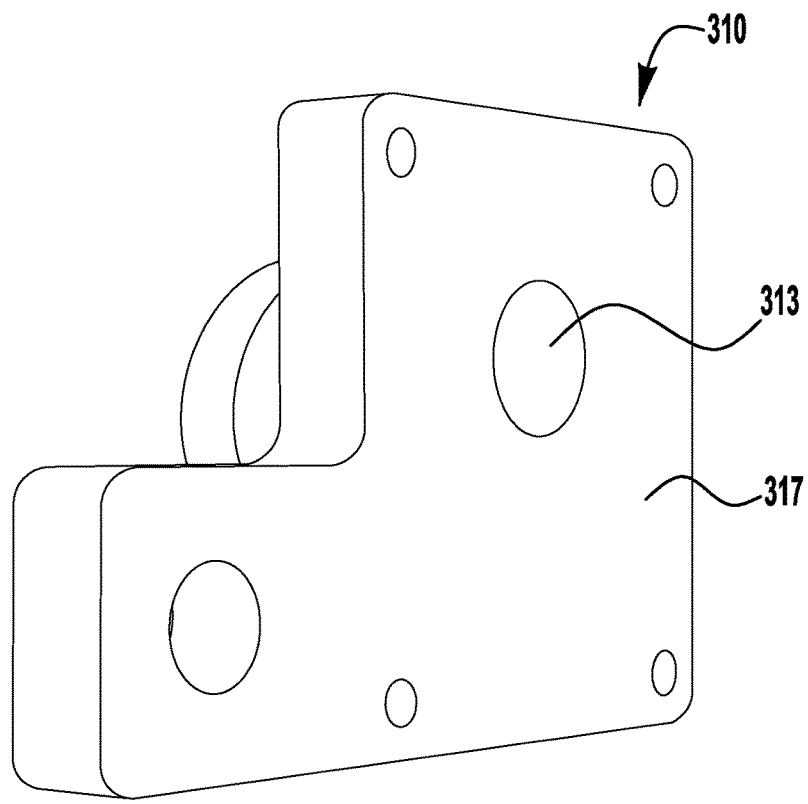

FIGS. 4A and 4B depict an exemplary embodiment of the power block portion 310. The power block 310 has a mounting face 311 which butts up against the inside surface of the wire feeder housing such that the cable connection extension portion 312 extends beyond the housing of the wire feeder and extends out such that the cable connector portion 320 is connected in the outside of the wire feeder housing. As shown, in the exemplary embodiments the extension portion 312 is circular in diameter and has a plurality of passages 313, 314, 315 and 316 in distal end face of the extension portion 312. The passage 313 extends from the distal end to the interior face 317 of the power block. When the power block 310 is mounted to the wire feeder 200 the interior face is positioned within the housing face the wire driving mechanisms in the wire feeder.

The passage 313 is the wire guide passage through which the wire guide from the cable 135 passes through the power block such that it couples the interior cavity of the wire feeder with the outside of the wire feeder. The wire guide assembly passes through this passage 313, and during use of the wire feeder 200, the wire consumable passes through this passage via the wire guide and into the cable 135. The other passages 314, 315 and 316 can be used for shielding gas, cooling gas and/or cooling liquid (for liquid cooled torches) as needed. In the embodiment shown, the passages 314, 315 and 316 are connected to exit passages (not shown) at the bottom 318 of the block 310 where connections are made for the gas/liquid as needed. It should be noted that embodiments of the present invention are not limited to liquid cooled embodiments, but can apply to both liquid cooled and non-liquid cooled wire feeders.

Figure 5A:
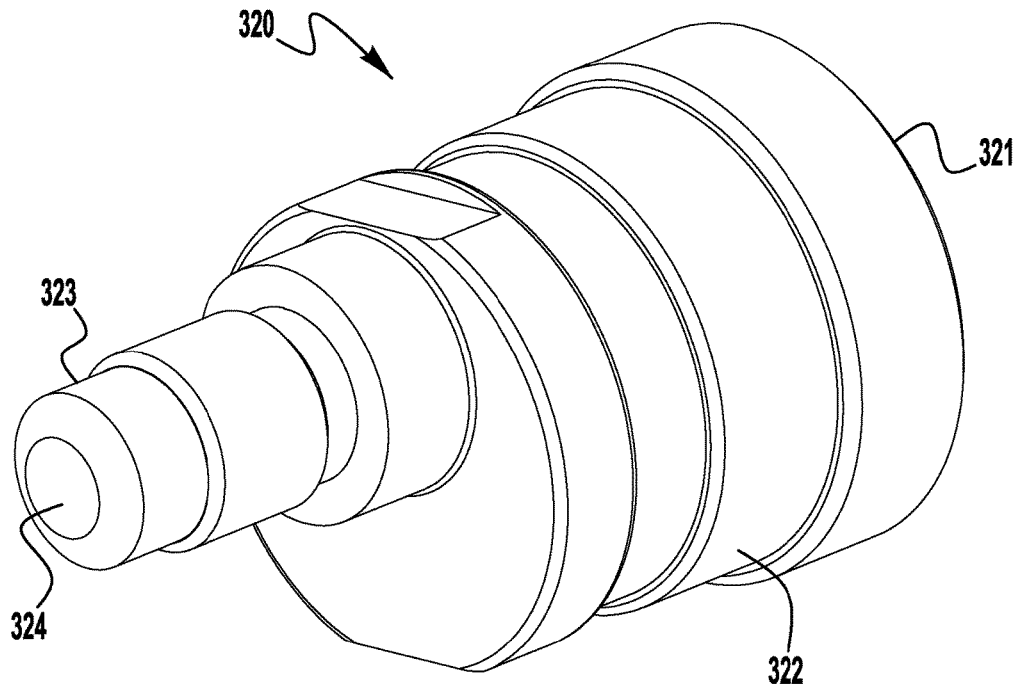
FIGS. 5A and 5B are diagrammatical representations of an exemplary cable connection portion.
Figure 5B:
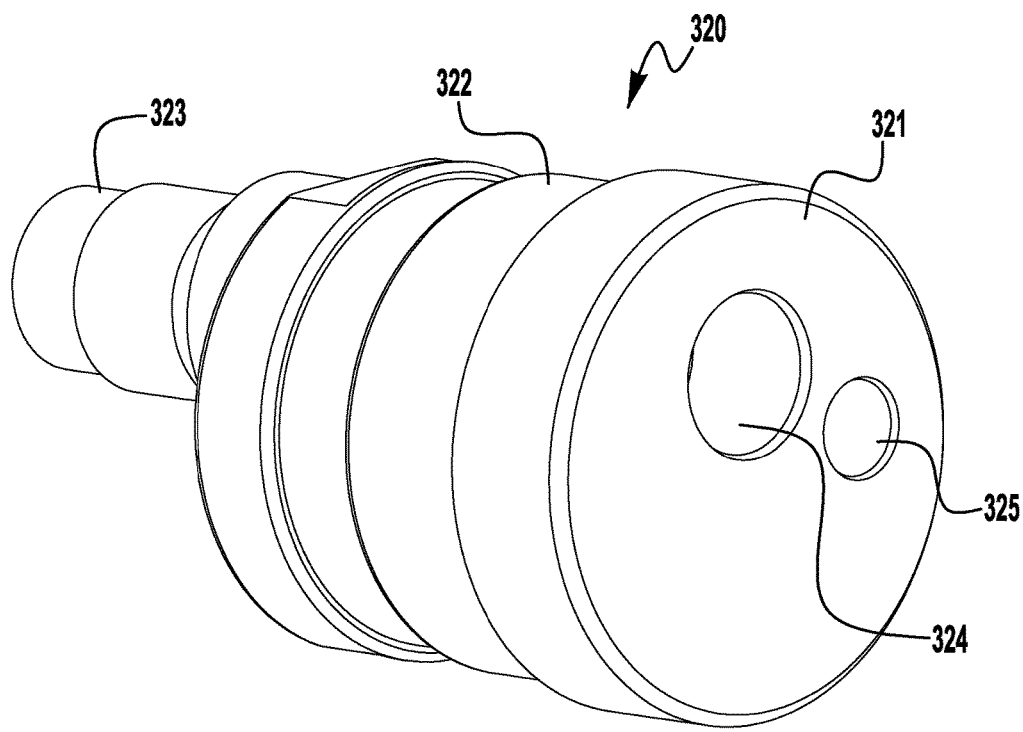

FIGS. 5A and 5B depict an exemplary embodiment of the cable connector portion 320. The cable connection portion 321 has a connection end 321 which is coupled to the extension portion 312 of the power block 310 and a cable connection end 323 to which the cable 135 is connected. As shown, the cable connection end 323 has a smaller diameter of the connection end 321 and is positioned offset from the centerline of the connection end 321. That is, as shown, the cable connection end 323 has a passage 324 which passes through the connector portion 320 from the distal end of the cable connector end 232 to the connector end 321 (see, e.g., FIG. 5B). The passage 324 is shown offset with respect to the centerline of the connector end 321 such that the passage 324 aligns with the passage 313 of the power block 310. Thus, when the connector 320 is connected to the power block 310 the passages 313 and 324 align with each other such that the liner for the cable 135 can pass directly through each of the power block and the connector 320. Further, the connector 320 contains an additional passage 325 which aligns with one of the passages 314, 315 or 316 on the end 312 of the power block 310. The passage 325 is in communication with the passage 323 such that shielding gas which passes through the power block 310 (through one of the passages 314, 315 and 316) is directed into the passage 325 and then ultimately to passage 323. This shielding gas is then directed to the torch via the cable on the outside of the wire guide assembly. It should be noted that the connector 320 can have further passages to align with the other two of the passages 313, 314 and 315 to allow for fluid flow to the torch if the torch is a water cooled torch. One of the additional passages would be for outbound flow to the torch and the other would be for returning flow from the torch.

Figure 6:
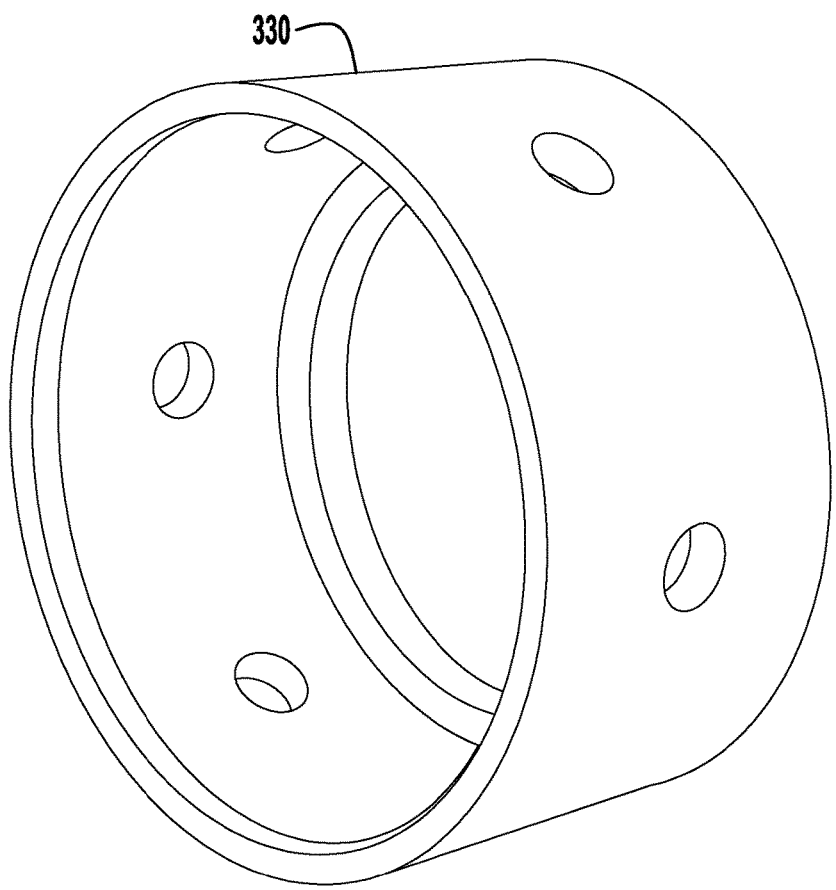
FIG. 6 is a diagrammatical representation of an exemplary coupling to be used to couple a power block to a cable connector.

FIG. 6 depicts an exemplary coupling 330 that can be used to couple the connector portion 320 to the end 312 of the power block 310. The coupling 330 can use threads or other engagement type structure to couple to connector 320 and the power block 310 to ensure a secure connection between the two components to provide proper function, security and proper gas flow.

Figure 7:
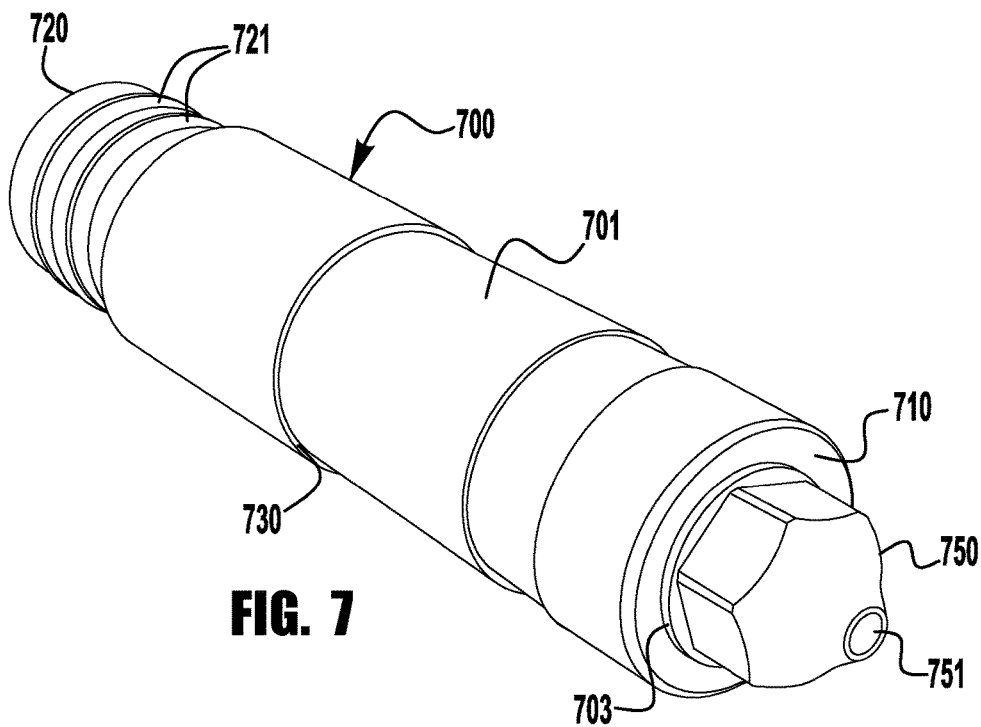
FIG. 7 is a diagrammatical representation of an exemplary liner guide assembly to be inserted into an exemplary power block.
Figure 8:
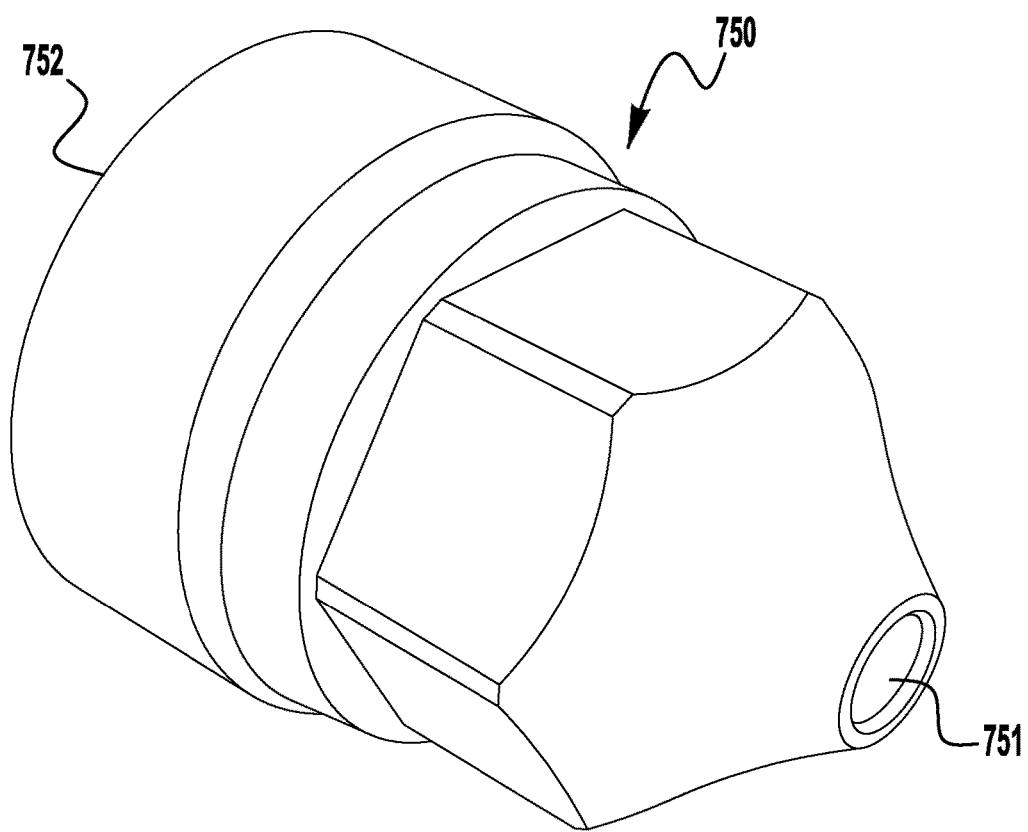
FIG. 8 is a diagrammatical representation of an exemplary nipple for the liner guide assembly.

FIG. 7 depict a liner guide assembly 700 to be used with embodiments of the present invention. The liner guide assembly 700 comprises a liner guide body portion 701 and a liner guide nipple 750 which is inserted into a cavity 703 of the body portion 701. The cavity 701 extends the length of the body portion 701 and exits from the distal end 720 of the body portion. FIG. 8 depicts an exemplary embodiment of the nipple 750. The nipple 750 can be inserted into the cavity 703 at the wire feeder end 710 of the body 701 via a threaded connection. The nipple 750 has a wire guide passage 751 through which the wire/consumable passes to enter the wire guide and eventually pass to the torch. As shown, the distal end of the 720 of the body 701 can have a plurality of O-rings 721 to aid in stabilizing and securing the body 701 in the connector 320.

Figure 9:
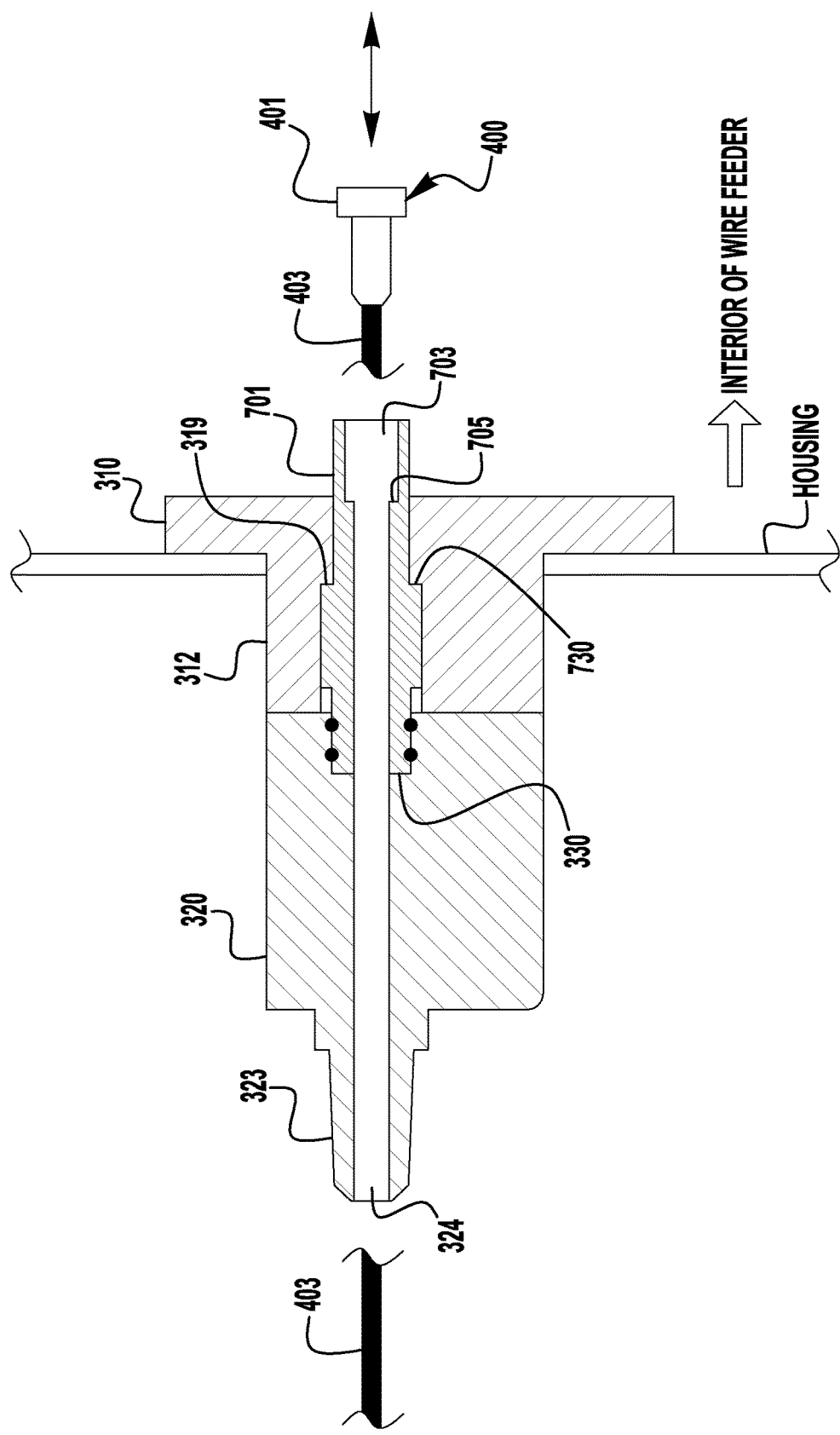
FIG. 9 is a diagrammatical representation of components of the wire feeder coupled together.

Turning now to FIG. 9, which depicts an exemplary assembly of the components discussed above in a wire feeder. Some components and items discussed above are not shown for clarity. As shown, the power block 310 is coupled to the housing of the wire feeder such that the passage 313 is open to the interior of the wire feeder and the exterior of the wire feeder. The liner guide body 701 is inserted into the distal end of the passage 313 (the distal end is outside the feeder housing) such a shoulder portion 730 on the body 701 engages with a shoulder portion 319 within the passage 313 of the power block 310. These shoulder portions 730 and 319 engage with each other such that the body 701 does not extend too far into the wire feeder interior and holds the body 701 in the desired dimensional relationship. The distal end of the body (with the O-rings, e.g.,) extends from the distal end of the passage 313. The connector portion 320 is then secured to the end 312 of the power block (via a threaded collar or the like—not shown) and the passage 324 of the connector 320 also has a shoulder portion 330 internal in the passage 324 which engages with the distal end face 720 of the body 701, as shown. Thus, the shoulders 319 and 330 work in concert to hold the body 701 in a desired dimensional relationship. The passage 324 has a diameter at its end which couples with the block 310 such that the end of the body 701 can fit in and the O-rings can work properly, and the shoulder 330 has a height which is sufficient to secure the body 701 in place. The liner assembly 400 can then be inserted into the body 701 from the interior of the wire feeder such that the end cap 401 of the liner assembly engages with an interior shoulder 705 within the passage 703 and the flexible wire guide 403 passes through the passage 324 and extends to the torch via the cable 135 (not shown). Once the wire guide assembly 400 is inserted such that the cap 401 engages with the shoulder 705, the nipple 750 can be inserted into the body 701. Once fully inserted, the distal end face 752 of the nipple 750 and the shoulder 705 in the passage 703 create a containment cavity (having a larger diameter than the rest of the passage 703), where the containment cavity is used to hold the end cap 401 and thus the liner assembly 400 in a secured relationship with the remaining components. To use the wire feeder, the consumable is then directed through the passage 751 of the nipple 750 and into the liner assembly 400 and to the torch.

Unlike known systems, exemplary embodiments like those discussed herein allow for the liner assembly 400 to be removed simply by removing the nipple 750 from the interior of the wire feeder. The connector 320 need not be removed or disconnected from the power block 310 or the wire feeder. This significantly reduces the time needed to change the liner assembly 400 and greatly reduces the risk of damaging or losing any of the connection components. In known systems, many of the above described components had to be disconnected and/or removed to allow for removal of the liner assembly 400. With embodiments described herein, only the housing need be opened and the nipple 750 be removed.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

I claim:

1. A wire feeder, comprising:
 a wire drive mechanism;
 a housing which contains said wire drive mechanism, said housing having a moveable cover portion which allows access to at least some of said wire drive mechanism when said cover portion is moved to an open position, and said wire drive mechanism directs a wire to an exit for said wire in said housing;
 a power block portion coupled to said housing at said exit, said power block portion having at least one passage which passes through said power block portion to provide access from inside of said housing to outside of said housing, said at least one passage having a shoulder portion within said at least one passage; and
 a liner guide assembly comprising a liner guide body portion and a wire nipple portion, said liner guide body portion has a passage through said liner guide body portion, an exterior shoulder portion on an outer surface of said liner guide body portion and an interior shoulder portion on an interior of said passage through said liner guide body portion, and said nipple portion is inserted into an interior end of said passage through said liner guide body portion;
 wherein said liner guide assembly is inserted into said at least one passage such that said exterior shoulder portion of said liner guide body portion engages with said shoulder portion in said at least one passage of the power block portion, and
 wherein a containment cavity is created between a distal end face of said wire nipple portion and said interior shoulder portion of said passage through said liner guide body portion, and said containment cavity opens to said interior of said wire feeder when said nipple portion is removed.

2. The wire feeder of claim 1, further comprising a liner assembly having an end cap and a liner, where said end cap is secured in said containment cavity to hold said liner assembly in a secured position, and wherein said liner assembly can be removed by removal of said nipple portion.

3. The wire feeder of claim 1, further comprising a cable connector portion which couples to said power block portion outside of side wire feeder housing, and said cable connector portion has a passage which communicates with said at least one passage of said power block.

4. The wire feeder of claim 3, wherein said passage of said cable connector portion has a shoulder portion, where said shoulder portion of said passage of said cable connector portion engages with a distal end surface of said liner guide body portion when said cable connector portion is coupled to said power block.

5. The wire feeder of claim 3, wherein said liner guide assembly comprises at least one o-ring groove positioned near a distal end of said liner guide body portion, wherein said o-ring groove will be positioned within said passage of said cable connector portion when said cable connector portion is coupled to said power block.

6. A wire feeder, comprising:
 a wire drive mechanism;
 a housing which contains said wire drive mechanism, said housing having a moveable cover portion which allows access to at least some of said wire drive mechanism when said cover portion is moved to an open position, and said wire drive mechanism directs a wire to an exit for said wire in said housing;
 a power block portion coupled to said housing at said exit, said power block portion having at least one passage which passes through said power block portion to provide access from inside of said housing to outside of said housing, said at least one passage having a shoulder portion within said at least one passage; and
 a liner guide assembly comprising a liner guide body portion and a wire nipple portion, said liner guide body portion has a passage through said liner guide body portion, an exterior shoulder portion on an outer surface of said liner guide body portion and an interior shoulder portion on an interior of said passage through said liner guide body portion, and said nipple portion is inserted into an interior end of said passage through said liner guide body portion;

a liner assembly having an end cap and a liner; and a cable connector portion which couples to said power block portion outside of side wire feeder housing, and said cable connector portion has a passage which communicates with said at least one passage of said power block, wherein said liner guide assembly is inserted into said at least one passage such that said exterior shoulder portion of said liner guide body portion engages with said shoulder portion in said at least one passage of the power block portion, wherein a containment cavity is created between a distal end face of said wire nipple portion and said interior shoulder portion of said passage through said liner guide body portion, and said containment cavity opens to said interior of said wire feeder when said nipple portion is removed, and wherein said end cap of said liner assembly is secured in said containment cavity to hold said liner assembly in a secured position, and wherein said liner assembly can be removed by removal of said nipple portion.

7. The wire feeder of claim 6, wherein said passage of said cable connector portion has a shoulder portion, where said shoulder portion of said passage of said cable connector portion engages with a distal end surface of said liner guide body portion when said cable connector portion is coupled to said power block.

8. The wire feeder of claim 6, wherein said liner guide assembly comprises at least one o-ring groove positioned near a distal end of said liner guide body portion, wherein said o-ring groove will be positioned within said passage of said cable connector portion when said cable connector portion is coupled to said power block.

\* \* \* \* \*